(12) United States Patent
Kono et al.

(10) Patent No.: US 7,723,615 B2
(45) Date of Patent: May 25, 2010

(54) FLUORORESIN COMPOSITION AND ELECTRIC WIRE

(75) Inventors: Hideki Kono, Settsu (JP); Kenji Ishii, Settsu (JP); Yoshiyuki Takase, Settsu (JP); Sadashige Irie, Settsu (JP); Takahiro Kitahara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 261 days.

(21) Appl. No.: 11/920,442

(22) PCT Filed: May 17, 2006

(86) PCT No.: PCT/JP2006/309821

§ 371 (c)(1), (2), (4) Date: Nov. 15, 2007

(87) PCT Pub. No.: WO2006/123694

PCT Pub. Date: Nov. 23, 2006

(65) Prior Publication Data

US 2009/0044965 A1 Feb. 19, 2009

(30) Foreign Application Priority Data

May 18, 2005 (JP) ............................. 2005-146056

(51) Int. Cl.
*H01B 7/00* (2006.01)
(52) U.S. Cl. ............................. 174/110 R; 174/110 SR; 174/110 PM
(58) Field of Classification Search ............. 174/110 R, 174/110 FC, 120 R, 120 C, 120 SC, 110 N, 174/110 M
See application file for complete search history.

(56) References Cited

U.S. PATENT DOCUMENTS

| 5,473,018 | A | 12/1995 | Namura et al. |
| 5,543,217 | A * | 8/1996 | Morgan ................. 428/375 |
| 5,677,217 | A * | 10/1997 | Tseng .................. 438/217 |
| 7,169,854 | B2 | 1/2007 | Namimatsu et al. |
| 7,291,678 | B2 | 11/2007 | Namimatsu et al. |
| 2002/0111433 | A1 | 8/2002 | Lee et al. |
| 2003/0102593 | A1 | 6/2003 | Kaulbach et al. |
| 2004/0024783 | A1 | 12/2004 | Yabu et al. |
| 2004/0242783 | A1* | 12/2004 | Yabu et al. ............. 525/199 |

FOREIGN PATENT DOCUMENTS

| DE | 43 19 045 A1 | | 12/1993 |
| EP | 1 260 526 A1 | * | 3/2001 |
| EP | 1 260 526 A1 | | 11/2002 |
| EP | 1 262 496 A1 | | 12/2002 |
| EP | 1306407 A1 | | 5/2003 |
| JP | 52-98761 | | 8/1977 |
| JP | 5-301294 A | | 11/1993 |
| JP | 6-283831 A | | 10/1994 |
| JP | 7-70397 | | 3/1995 |
| JP | 2002-293831 | * | 10/2002 |
| JP | 2002-293831 A | | 10/2002 |
| JP | 03/022923 A1 | | 3/2003 |
| JP | 2004-502853 | | 1/2004 |
| WO | WO 01/18076 A1 | | 3/2001 |
| WO | WO 01/36504 A1 | | 5/2001 |
| WO | WO 02/04560 A1 | | 1/2002 |
| WO | WO 02/079280 A1 | | 10/2002 |
| WO | WO 03/022922 A1 | | 3/2003 |
| WO | WO 03/022923 | * | 3/2003 |
| WO | WO 03/022923 A1 | | 3/2003 |

* cited by examiner

Primary Examiner—William H Mayo, III
(74) Attorney, Agent, or Firm—Sughrue Mion, PLLC

(57) ABSTRACT

A fluororesin composition including a tetrafluoroethylene/hexafluoropropylene-based copolymer and 0.01 to 3 parts by mass per 100 parts the copolymer of a polytetrafluoroethylene having a standard specific gravity of 2.15 to 2.30, and being obtained by mixing an aqueous dispersion of the tetrafluoroethylene/hexafluoropropylene-based copolymer with an aqueous dispersion of the polytetrafluoroethylene, causing coagulation, drying the polymer mixture and melt-extruding the same.

9 Claims, No Drawings

FLUORORESIN COMPOSITION AND ELECTRIC WIRE

TECHNICAL FIELD

The present invention relates to a fluororesin composition and an electric wire.

BACKGROUND ART

Fluororesins are excellent in such characteristics as thermal stability, chemical resistance, solvent resistance and insulating properties and therefore, when molded by melt extrusion, can give such products as tubes, electric wire coverings, pipes and filaments. In particular, fluororesins comprising tetrafluoroethylene [TFE]/hexafluoropropylene [HFP]-based copolymer [FEP] are low in dielectric constant and dielectric loss tangent and thus have good insulating properties and therefore are suitably used in the field of covering of such electric conductors as cables and wires.

In molding electric wire coverings, for instance, a material is required which makes it possible to increase the molding speed and, at the same time, reduce the proportion of defective moldings so that the productivity may be improved and the cost may be reduced.

For the purpose of reducing the phenomenon of melt fracture among molding defects and improving the critical extrusion speed, it has been proposed that a polytetrafluoroethylene [PTFE] be incorporated in a FEP to a PTFE content of 0.01 to 5% by weight (cf. e.g. Patent Document 1: Japanese Kokai (Laid-open) Publication S52-98761) and, for the purpose of diminishing covering breakage in the process of covering electric wires, it has been proposed that 0.03 to 2 parts by weight of PTFE be incorporated in 100 parts by weight of a FEP or a terpolymer thereof with a perfluoro(alkyl vinyl ether) (cf. e.g. Patent Document 2: International Publication WO 03/22922 and Patent Document 3: International Publication WO 03/22923).

In these technologies, it is indeed disclosed that PTFE be incorporated in the form of a dispersion. As for the FEP and terpolymer mentioned above, however, they are added each in the form of a powder; there is no description of their being incorporated in the form of dispersions.

These technologies are indeed effective to some extent in reducing the size of resin lumps formed between the covering resin and conductor but have a problem in that they are insufficient for reducing the frequency of lump formation.

It has been proposed that in preparing a melt-processable composition comprising a FEP and 0.01 to 5% by weight, relative to the FEP, of a high-molecular-weight perfluoropolymer having a melting point higher by at least 20° C. than the FEP, the FEP and perfluoropolymer be compounded each in the form of a dispersion (cf. e.g. Patent Document 4: Japanese Kohyo (Laid-open under PCT) Publication 2004-502853). As regards this perfluoropolymer, mention is made only of TFE/HFP copolymers containing 2 to 20% by weight of HFP units as essential units. No mention is made of PTFE.

Allegedly, this composition carries away lumps and prevents them from accumulating in wire covering molding. However, like the above-mentioned technology consisting in compounding a FEP powder with PTFE, there is a problem in that it does not reduce the frequency of lump formation. Lumps small in size cause increases in capacitance fluctuation and the problem of deteriorations in electric characteristics of final products is produced thereby.

For the purpose of attaining stable moldability by reducing the fluctuations in wire covering diameter in wire covering molding, a FEP copolymer has been proposed which shows a relatively high die swell ratio of 5 to 20% and shows a melt flow rate within a specified range (cf. e.g. Patent Document 5: International Publication WO 01/36504). However, there is no description at all of the addition of a high-molecular-weight perfluoropolymer such as PTFE.

As a fluororesin serving as a material for moldings excellent in surface smoothness, a TFE/fluoroalkyloxytrifluoroethylene copolymer composition containing 0.01 to 30% by weight of PTFE having a crystallization temperature not lower than 305° C. has been proposed (cf. e.g. Patent Document 6: Japanese Kokai Publication H07-70397). However, it is not certain whether this PFA composition, when used to cover electric wires by high-speed extrusion molding, can give covered electric wires showing no molding defect.

DISCLOSURE OF INVENTION

Problems which the Invention is to Solve

In view of the above-discussed state of the art, it is an object of the present invention to provide a fluororesin composition which is improved in moldability in melt extrusion molding and, in particular, makes it possible to markedly reduce molding defects even when the extrusion molding for covering electric wires is carried out at a high speed.

Means for Solving the Problems

The present invention is a fluororesin composition comprising a tetrafluoroethylene/hexafluoropropylene-based copolymer and 0.01 to 3 parts by mass per 100 parts the copolymer of a polytetrafluoroethylene having a standard specific gravity of 2.15 to 2.30, and being obtained by mixing an aqueous dispersion of the tetrafluoroethylene/hexafluoropropylene-based copolymer with an aqueous dispersion of the polytetrafluoroethylene, causing coagulation, drying the polymer mixture and melt-extruding the same.

The present invention is an electric wire comprising a core conductor and a covering formed around the core conductor using a fluororesin composition, the fluororesin composition being the above-mentioned fluororesin composition.

The present invention is a foamed electric wire comprising a core conductor and a covering formed around the core conductor using a fluororesin composition, the fluororesin composition being the above-mentioned fluororesin composition.

In the following, the present invention is described in detail.

The fluororesin composition of the invention comprises 100 parts by mass of a FEP and 0.01 to 3 parts by mass of polytetrafluoroethylene [PTFE] having a standard specific gravity of 2.15 to 2.30.

The above-mentioned FEP is a fluorocopolymer derived from TFE and HFP and is melt-processable.

The FEP may be any one derived from TFE and HFP and may be a copolymer of TFE, HFP and one or more other monomers.

The other monomers are not particularly restricted but include, among others, perfluorovinyl ethers [PFVEs], chlorotrifluoroethylene [CTFE], vinyl fluoride [VF] and hexafluoroisobutene.

The PFVEs are not particularly restricted but include, among others, unsaturated perfluoro compounds represented by the general formula: $CF_2=CF-ORf$ (in which Rf represents an aliphatic perfluorohydrocarbon group).

The "aliphatic perfluorohydrocarbon group", so referred to herein, means a group derived from an aliphatic hydrocarbon group by substitution of all carbon-bound hydrogen atoms with fluorine atoms. The aliphatic perfluorohydrocarbon group may contain one or more ether-forming oxygen atoms.

As the PFVEs, there may be mentioned perfluoro(alkyl vinyl ether) species [PAVEs]. The PAVEs are compounds represented by the general formula: $CF_2=CFO(CF_2)_nCF_3$ (in which n represents an integer of 0 to 3).

As the PAVEs, there may be mentioned perfluoro(methyl vinyl ether) [PMVE], perfluoro(ethyl vinyl ether) [PEVE], perfluoro(propyl vinyl ether) [PPVE], perfluoro(butyl vinyl ether), etc. Among them PMVE, PEVE and PPVE are preferred from the crack resistance viewpoint, and PPVE is more preferred.

The FEP is preferably a perfluoropolymer, more preferably a copolymer consisting of TFE units, HFP units and PFVE units, still more preferably a copolymer consisting of TFE units, HFP units and PFVE units and having a melting point not lower than 249° C. and not higher than 280° C., in particular a melting point not lower than 250° C. and not higher than 270° C.

When the FEP contains the above-mentioned PFVE units, the PFVE units may be those derived from one single species or two or more species.

Each TFE unit, each HFP unit and each PFVE unit are respectively derived from TFE, HFP and the corresponding PFVE and each is a part of the molecular structure of the FEP. For example, the TFE unit is represented by $-(CF_2CF_2)-$.

The FEP is preferably one consisting of TFE units and HFP units alone or one consisting of TFE units, HFP units and PFVE units alone. From the molding defects reduction viewpoint, it is more preferably one consisting of TFE units, HFP units and PFVE units alone.

The FEP preferably has a (TFE units):(HFP units) mass ratio (the sum of both monomers being taken as 100) of (70 to 95):(5 to 30), more preferably (85 to 95):(5 to 15).

When the FEP is one obtained by copolymerization with the above-mentioned other monomer or monomers, the content of the monomer units derived from the other monomer or monomers is generally not higher than 10% by mass of all the monomer units.

When the FEP consists of TFE units, HFP units and PFVE units alone, the (TFE units):(HFP units):(PFVE units) mass ratio (the sum of all units being taken as 100) is preferably (70 to 95):(4 to 20):(0.1 to 10), more preferably (75 to 95):(5 to 15):(0.3 to 3).

When the PFVE units are derived from two or more monomer species, for example in the case of two species, namely PMVE units and PPVE units, being involved, the proportion of the PFVE units in the above-mentioned mass ratio is based on the total mass of the units derived from the two or more monomer species.

The mass ratio, so referred to herein, is obtained by measuring the TFE unit, HFP unit and PFVE unit contents using an NMR spectrometer (Bruker BioSpin model AC300, high-temperature prog.) or an infrared absorption spectrometer (Perkin-Elmer model 1760).

The FEP to be used in the practice of the invention generally has a melting point not lower than 240° C. and not higher than 280° C. When the melting point is lower than 240° C., a problem may arise: the thermal stability, in particular the thermal stability of covered electric wire moldings, may become insufficient. When the melting point is higher than 280° C., the covering extrusion molding tends to become difficult. A preferred lower limit to the melting point mentioned above is 250° C., a more preferred lower limit thereto is 255° C., a preferred upper limit thereto is 270° C. and a more preferred upper limit thereto is 265° C.

The melting point, so referred to herein, is the peak temperature in the endothermic reaction on a thermal melting curve obtained upon measurement at a programming rate of 10° C./minute using a differential scanning calorimeter [DSC] (product of Seiko).

The FEP mentioned above preferably shows a melt flow rate [MFR] of 10 to 60 (g/10 minutes).

When the MFR of the FEP is within the above range, the molding speed in covering molding can be increased and products electrically small in capacitance fluctuations can be obtained from the composition obtained from that FEP.

From the viewpoint of increasing the molding speed, a more preferred lower limit to the above-mentioned MFR is 20 (g/10 minutes), a more preferred upper limit thereto is 40 (g/10 minutes) and a still more preferred upper limit thereto is 35 (g/10 minutes).

The MFR, so referred to herein, is measured at a temperature of 372° C. under a load of 5 kg using about 6 g of the FEP and using a melt index tester according to ASTM D 1238-98 or JIS K 7210.

The above-mentioned FEP can be prepared by carrying out the polymerization reaction using TFE and HFP, if desired together with a monomer or monomers other than TFE and HFP, if necessary followed by after-treatment such as concentration.

The polymerization reaction is not particularly restricted but, for example, mention may be made of emulsion polymerization, suspension polymerization, solution polymerization and gaseous phase polymerization. Preferred as the polymerization method are emulsion polymerization and suspension polymerization; emulsion polymerization is more preferred.

The fluororesin composition of the invention comprises polytetrafluoroethylene [PTFE] in addition to the above-mentioned FEP.

The "PTFE", so referred to herein, may be a tetrafluoroethylene [TFE] homopolymer or modified polytetrafluoroethylene [modified PTFE] obtained from TFE and a very small proportion of a comonomer.

The TFE homopolymer is obtained by polymerizing tetrafluoroethylene [TFE] as the only monomer.

The very small proportion comonomer in the modified PTFE mentioned above is not particularly restricted but any fluorinated compound copolymerizable with TFE. For example, there may be mentioned perfluoroolefins such as hexafluoropropene [HFP]; the above-mentioned various PAVE species and like perfluorovinyl ethers [PFVEs]; fluorodioxoles; trifluoroethylene; vinylidene fluoride and so on.

In the above-mentioned modified PTFE, the proportion of the very small proportion monomer units derived from the very small proportion monomer mentioned above to all the monomer units is generally 0.001 to 1.0% by mass.

The "proportion (% by mass) of the very small proportion monomer units to all the monomer units" so referred to herein means the mass fraction (% by mass) of the very small proportion monomer from which the very small proportion monomer units are derived relative to the total amount of the monomers from which "all the monomer units" are derived, namely the total amount of the monomers incorporated in the constitution of the fluoropolymer.

From the viewpoint of thermal stability and electric characteristics, the above-mentioned PTFE preferably has a standard specific gravity [SSG] of 2.15 to 2.30, more preferably not higher than 2.25, still more preferably not higher than 2.22.

High-molecular-weight PTFE species lower in SSG than 2.15 are difficult to produce and are impractical, although they will not negate the effects of the invention.

The above SSG is the value measured by the water displacement method according to ASTM D 4895-89.

When the SSG of the PTFE is low, the effect of reducing molding defects can be produced at low addition levels. When the SSG is high, the above effect can be achieved by raising the addition level.

The above-mentioned PTFE can be prepared in the conventional manner by emulsion polymerization or suspension polymerization, for instance. Emulsion polymerization is preferred as the method of polymerization, however.

When agglomerates of PTFE occur in the fluororesin composition of the invention, spark-out occurs frequently during electric wire covering molding, with the result that the defective product percentage increases. Therefore, the average primary particle diameter of the PTFE is preferably 50 to 800 nm, more preferably 50 to 500 nm.

The average primary particle diameter of PTFE is the value determined in the following manner. A working curve is constructed which shows the relation between the transmittance of incident light rays having a wavelength of 500 nm per unit length of the polymer latex diluted with water to a solid matter content of 0.22% by mass and the number-based length average particle diameter of PTFE as determined by particle diameter measurements in a certain specific direction on a transmission electron photomicrograph, and the average primary particle diameter of the sample is determined, using that working curve, from the transmittance measured in the same manner.

The fluororesin composition of the invention preferably contains the PTFE in an amount of 0.01 to 3 parts by mass relative to 100 parts by mass of the FEP. When that amount is smaller than 0.01 part by mass, the effect of the addition of PTFE may not be produced and, when it is in excess of 3 parts by mass, covering breakage occurs frequently in electric wire covering molding due to poor dispersion of PTFE; this is a problem.

A more preferred lower limit to the PTFE content in the above fluororesin composition is 0.03 part by mass, a more preferred upper limit thereto is 2 parts by mass and a still more preferred upper limit thereto is 1 part by mass, relative to 100 parts by mass of the FEP.

The fluororesin composition of the invention may comprise, in addition to the above-mentioned FEP and PTFE, one or more of known additives, such as fillers and stabilizers, as incorporated therein each at an appropriate level.

When the fluororesin composition of the invention is prepared by incorporating a sodium element-containing metal catalyst in the melt extrusion step (2) described later herein, the composition is preferably one having a sodium element content is preferably 5 to 100 ppm.

When the sodium element content is lower than 5 ppm, the effect of the addition of the sodium element-containing metal catalyst may not be obtained and, when it is in excess of 100 ppm, the effect will not be obtained to an extent proportional to the level of addition of the metal catalyst in certain instances.

A more preferred lower limit to the sodium element content is 7 ppm and a more preferred upper limit thereto is 80 ppm.

The metal element contents such as the above-mentioned sodium element content, so referred to herein, were measured by the incineration method. As regards the contents of metal elements other than potassium, the incineration method comprises adding 2 g of a 0.2% (by mass) aqueous solution of potassium sulfate and about 2 g of methanol to 2 g of the sample, consuming the resin by fire by 30 minutes of heating at 580° C., washing the residue obtained twice with 20 ml (10 ml×2) of 0.1 N hydrochloric acid and subjecting the washings (0.1 N hydrochloric acid) to atomic absorption spectrometry (apparatus: Hitachi model Z-8100 Zeeman atomic absorption spectrometer). As for the potassium content, the incineration method was carried out under the same conditions as mentioned above except that a 0.2% (by mass) aqueous solution of sodium sulfate was used in lieu of the 0.2% (by mass) aqueous solution of potassium sulfate.

The fluororesin composition of the invention is obtained by mixing up the above-mentioned FEP-containing aqueous dispersion and the above-mentioned PTFE-containing aqueous dispersion, allowing coagulation to proceed, and melt-extruding the coagulum.

Thus, the fluororesin composition of the invention can be produced by a process for fluororesin composition production which comprises a co-coagulation step (1) in which a FEP-containing aqueous dispersion and a PTFE-containing aqueous dispersion are mixed up, coagulation is allowed to proceed and the coagulum is preferably dried to give a co-coagulum powder and a melt-extrusion step (2) in which the co-coagulum powder is subjected to melt-extrusion.

The above-mentioned co-coagulation step (1) comprises mixing a FEP-containing aqueous solution and a PTFE-containing aqueous dispersion together, followed by coagulation. The coagulation following mixing up both aqueous polymer dispersions is sometimes referred to herein as "co-coagulation".

The polymer solid concentration in each of the aqueous polymer dispersions is not particularly restricted but can be properly selected according to the species and amount of each polymer used. It is preferably 1 to 70% by mass, more preferably 3 to 50% by mass.

The aqueous medium constituting each of the above-mentioned aqueous polymer dispersions may be any water-containing medium and, thus, it may be one containing a water-soluble organic solvent such as a water-soluble alcohol or one not containing any water-soluble organic solvent.

For better dispersibility, each of the aqueous polymer dispersion preferably contains a surfactant known in the art and/or the like at a level at which the moldability of the resin obtained will not be impaired.

The co-coagulation can be carried out by mixing both the aqueous dispersions together so that PTFE may amount to 0.01 to 3 parts by mass relative to 100 parts by mass of the FEP.

In the above co-coagulation, the total polymer solid concentration in the mixed dispersion obtained by mixing up the above-mentioned two aqueous polymer dispersion is preferably adjusted to 5 to 40% by mass.

The coagulation method in the above co-coagulation is not particularly restricted but, for example, mention may be made of salt coagulation using nitric acid, hydrochloric acid or the like as a coagulant. Mention may also be made of the technique causing coagulation mechanically, for example by stirring, without using any coagulant.

The wet powder recovered after the above co-coagulation is preferred dried. The drying is preferably carried out at a temperature of 100 to 240° C. for 2 to 48 hours. On this occasion, such drying promoting means as pressure reduction or causing dry gas to flow can be employed.

The melt-extrusion step (2) comprises subjecting the co-coagulum powder obtained in the co-coagulation step (1) to melt-extrusion.

The melt-extrusion in the melt-extrusion step (2) can be carried out under extrusion conditions appropriately selected from among those extrusion conditions under which pelletization is generally possible.

In the practice of the invention, the above-mentioned FEP or FEP and PTFE may have such terminal group as $—CF_3$ and/or $—CF_2H$ on the polymer main chain and/or polymer side chains. However, the contents therein of thermally unstable groups, such as $—COOH$, $—CH_2OH$, $—COF$, $—CF=CF—$, $—CONH_2$ and $—COOCH_3$, are preferably low or null. Such thermally unstable groups can be reduced by the stabilization treatment described later herein.

The melt-extrusion in the melt-extrusion step (2) may be carried out on a twin-screw extruder, for instance, for pelletization and the simultaneous stabilization treatment mentioned above. In case the stabilization treatment is carried out, the cylinder temperature in the extruder employed is preferably set at a temperature of 280 to 430° C.

In the melt-extrusion step (2), the treatment for stabilization of the above-mentioned thermally unstable groups maybe carried out prior to the above-mentioned melt-extrusion.

When it is carried out prior to melt-extrusion, the above stabilization treatment is preferably carried out, for example, according to the method comprising kneading the above-mentioned co-coagulum powder in a twin-screw extruder at a cylinder temperature set at 280 to 430° C. while feeding water and air (oxygen) thereto or the method comprising bringing the co-coagulum powder into contact with $F_2$ gas (which may be fed as a $F_2/N_2$ mixed gas) for fluorination.

When the above-mentioned stabilization treatment is carried out according to the above-mentioned method comprising kneading the co-coagulum powder while feeding water and air (oxygen), it is preferred that a catalyst such as a catalyst containing a metal element such as an alkali metal or alkaline earth metal; ammonia, an alcohol, an amine or a salt thereof, be incorporated in addition to the above-mentioned water and air (oxygen). A metal catalyst is more preferred.

When a metal catalyst is used in the above stabilization treatment, the metal catalyst is preferably incorporated in an amount such that the metal element content in the fluororesin composition to be obtained may amount to 5 to 100 ppm, although that amount may vary according to the metal catalyst species used. A more preferred lower limit to the metal element content is 7 ppm and a more preferred upper limit thereto is 80 ppm. When the metal element content is below 5 ppm, the effect of the addition of a metal catalyst may be produced only to an insufficient extent in some cases and, when it is in excess of 100 ppm, the effect may be no more proportional of the level of addition of the metal catalyst in certain instances.

The metal catalyst may be incorporated beforehand in the co-coagulum powder. Preferably, however, it is added together with water since then it can be uniformly dispersed in the co-coagulum powder.

The metal element content in the above-mentioned fluororesin composition is the value measured by the incineration method mentioned above.

Preferred as the metal catalyst to be used in the above-mentioned stabilization treatment are ones containing an alkali metal element. Metal catalysts containing the sodium element are preferred among others.

In the art, potassium salts have been used as the above-mentioned metal catalyst for sufficient terminal stabilization. It has been found that the use, in the practice of the invention, of sodium salts in lieu of the potassium salts produces the following marked effects: (1) die drool no more occurs and (2) the useful life of the die tip is prolonged without corrosion. Die drool looks like a white trace of running of a liquid on the die surface and is capable of causing contamination of coverings and corrosion of the die.

The mechanism why the use of a sodium salt as the metal catalyst in the above stabilization treatment can prevent die drool is not clear but it is presumable that since the reactivity of Na with the polymer is lower as compared with K, the polymer terminal modification which is the cause of die drool can hardly occur. In particular when titanium dioxide is used as a pigment in molding electric wire coverings, the fact that the reactivity of Na with the titanium dioxide is lower as compared with K presumably contribute toward enhancing the die drool suppressing potential.

By the above-mentioned fluororesin composition production method, it is possible to obtain a fluororesin composition capable of markedly reducing molding defects such as spark-out while maintaining the moldability thereof. Further, the use of the above fluororesin composition in molding foamed electric wire coverings can result in uniform foaming and increases in foaming ratio (voids or void fraction). The composition is excellent in molding stability at high speeds and can give thinner foamed electric wire coverings. The mechanism why such excellent effects are produced is not clear but it is presumable that the co-coagulation involving mixing of the above-mentioned two aqueous polymer dispersions together makes it possible for PTFE to be sufficiently dispersed among FEP particles and even when low-molecular-weight molecules formed as byproducts in the step of polymerization are present, the entanglement among FEP and PTFE particles is enhanced to inhibit the low-molecular-weight molecules from being exposed, whereby the adverse effect of exposure of the low-molecular-weight molecules can be prevented.

The fluororesin composition of the invention preferably shows a complex viscosity of $2.5 \times 10^3$ to $4.0 \times 10^3$ Pa·s and a storage elastic modulus of 0.25 to 3.5 Pa in melt viscoelasticity measurement at 310° C. and an angular frequency of 0.01 rad/second, for instance.

When the complex viscosity and storage elastic modulus of the fluororesin composition mentioned above are within the above respective ranges, the composition shows good moldability and defective moldings tend to be hardly formed.

A more preferred lower limit to the complex viscosity is $3.0 \times 10^3$ Pa·s and a more preferred upper limit thereto is $3.8 \times 10^3$ Pa·s.

A more preferred lower limit to the storage elastic modulus is 0.30 Pa and a more preferred upper limit thereto is 3.0 Pa.

The complex viscosity and storage elastic modulus mentioned above are determined by carrying out frequency dispersion measurements in an atmosphere at 310° C. using a melt viscoelasticity measuring apparatus (Physica model MCR-500) while setting the parallel plate diameter at 25 mm and the gap distance at 1.5 mm. They are determined as values at an angular frequency of 0.01 rad/sec.

The die swell ratio of the fluororesin composition of the invention can be within the range of 5 to 35%. The melt tension of the fluororesin composition of the invention can be within the range of 0.08 to 0.16 N.

The fluororesin composition of the invention is preferably one having a die swell ratio of 5 to 35% and a melt tension of 0.08 to 0.16 N.

When the die swell ratio and melt tension thereof are within the above respective specific ranges, the fluororesin composition of the invention can prevent resin microlumps, even when they are formed at the extrusion opening in extrusion molding of electric wire coverings, from growing greatly to form lumps.

A more preferred lower limit to the die swell ratio is 7%, a more preferred upper limit thereto is 30% and a still more preferred upper limit thereto is 25%.

A more preferred lower limit to the melt tension is 0.1 N.

The die swell ratio, so referred to herein, is determined in the following manner. Using a capillograph (product of Rosand), 50 gram portion of the resin is fed to the cylinder with an inside diameter of 15 mm at about 372° C. and extruded through an orifice with a length of 0.26 mm and an inside diameter of 1 mm, the strand obtained is cooled to room temperature and the diameter of the strand is then measured at the extreme extrusion end is measured. The ratio in question is calculated based on this diameter.

The melt tension is the value obtained, as will be described later herein, by using the above-mentioned capillograph, feeding about 50 g of the resin to the cylinder with an inside diameter of 15 mm at about 385° C. and extruding the resin through an orifice with an inside diameter of 2 mm and a length of 20 mm at a shear rate of 36.5 (1/s) to give a strand, on which the melt tension is measured.

The fluororesin composition of the invention can have a melt flow rate [MFR] at 372° C. of not lower than 10 (g/10 minutes) Therefore, the fluororesin composition, when used to cover electric wires at a high speed, can give covered electric wires showing no great fluctuations in covered wire diameter.

The perfluororesin of the invention shows good moldability, hardly causes molding defects and, in addition, has good thermal stability, chemical resistance, solvent resistance, insulating properties and electric characteristics, among others, and therefore can be submitted to the manufacture of coverings for electric wires, foam-covered electric wires, cables, wires and the like and various moldings such as tubes, films, sheets and filaments, among others.

In extrusion molding of electric wire coverings, the fluororesin composition of the invention makes it possible to markedly reduce molding defects such as covering breakage, spark-out, lump formation and fluctuations in capacitance, which are the problems hitherto encountered in the art, without lowering the running speed. Therefore, the composition can be suitably used in extrusion molding of electric wire coverings.

In the art, such molding defects as mentioned above come into the limelight in particular in high-speed molding, namely at a running speed of 1000 feet [ft]/minute to 3000 ft/minute, whereas the fluororesin composition of the invention can be used in carrying out the extrusion molding of electric wire coverings, even in such high speed molding, without causing the molding defects so far encountered in the art.

The fluororesin composition of the invention, which has the constitution described above, when used in extrusion molding of electric wire coverings, can carry away resin microlumps, even when formed at the extrusion opening, from the extrusion opening before they greatly grow to form lumps and thus can give covered electric wires markedly reduced in the number of lumps as compared with the conventional ones.

The fluororesin composition of the invention can also be used in extrusion molding of foamed electric wire coverings. In this case, uniform foaming (void fraction) can be attained and the foaming rate can be increased. Further, it is excellent in molding stability at high speeds and makes it possible to obtain thinner foamed electric wire coverings. This is presumably due to the improvement with respect to tension owing to which foam breaking due to the nucleating agent for forming is hardly caused and resin starvation is hardly caused.

An electric wire comprising a core conductor and a covering formed on the core conductor out of the above-mentioned fluororesin composition of the invention also constitutes an aspect of the present invention.

The electric wire of the invention is not particularly restricted but maybe any one comprising a core conductor (core) and the covering mentioned above, for example a cable, a wire or the like.

The above-mentioned electric wire is suitably used as an insulated wire for communication, for example a data transmission cable, such as a LAN cable, or a like cable for connecting a computer with a peripheral device and also as a plenum cable to be installed in a space in the ceiling cavity (plenum area) of a building. The electric wire of the invention also includes coaxial cables, high-frequency cables, flat cables, heat-proof cables and so on.

The material for the core conductor in the electric wire of the invention is not particularly restricted but use may be made of a metal conductor material such as copper or silver, among others.

The electric wire of the invention preferably has a core conductor size of 2 to 80 mils in diameter.

The covering in the electric wire of the invention is not particularly restricted but may be any one made of the fluororesin composition of the invention. In particular, preferred is the fluororesin composition of the invention in which the FEP is a perfluoropolymer, more preferably one consisting of TFE units, HFP units and PFVE units, still more preferably one consisting of TFE units, HFP units and PFVE units and having a melting point of not lower than 240° C. and not higher than 280° C.

The covering of the electric wire of the invention preferably has a thickness of 1.0 to 20 mils.

The electric wire of the invention may further comprise a layer A (outer layer) formed around the covering or may be one comprising a layer A (outer layer) covering the core conductor and the above-mentioned covering formed around the layer A (outer layer).

The above-mentioned layer A (outer layer) is not particularly restricted but may be a resin layer made of such a resin as a TFE/PAVE copolymer, TFE/ethylene-based copolymer, vinylidene fluoride-based polymer, polyolefin resin (e.g. polyethylene [PE]) or poly(vinyl chloride) [PVC]. Among them, PE and PVC are preferred from the cost viewpoint.

The thickness of the layer A (outer layer) and the thickness of the above-mentioned covering are not particularly restricted. The thickness of the layer A (outer layer) may be 1 mil to 20 mils, and the thickness of the covering may be 1 mil to 20 mils.

The covering in the electric wire of the invention is made of the above-mentioned fluororesin composition of the invention and therefore can be molded by extrusion covering molding at a covering molding rate of 1000 to 3000 feet/minute. The electric wire of the invention shows only minor fluctuations in wire diameter and, even when the covering is formed by extrusion covering molding at a covering molding rate within the above range, it is possible to attain a process capability index [Cp] in wire diameter fluctuation measurements of not lower than 1.0.

A more preferred lower limit to the above-mentioned Cp in wire diameter fluctuation measurements is 1.2.

The above-mentioned Cp in wire diameter measurements is the value determined by electric wire outside diameter (OD) measurements using an outside diameter measuring apparatus, ODAC15XY (product of Zumbach), on the occasion of 20 hours of electric wire covering of a core conductor (20.1 mils in diameter) to give a covered wire diameter of 34.5 mils using a single-screw extrusion molding machine (product of Davis-Standard), followed by analysis with a tolerance of ±0.5 mil using USYS2000 (product of Zumbach).

The electric wire of the invention can give a Cp of not lower than 1.0 in capacitance measurements when the core conductor diameter is 18.0 to 24.0 mils and a covering thickness of 3.0 to 8.0 mils, for instance.

The Cp in the above capacitance measurement is the value determined by 20 hours of capacitance measurement using a capacitance meter, Capac HS (type: MR20.50HS, product of Zumbach), accumulation of the data obtained in USYS2000 (product of Zumbach) and analysis with a tolerance of ±1.0 (pf/inch).

When it is obtained by 20 hours of continuous forming by extrusion covering molding at a covering molding rate of 1000 to 3000 feet/minute, the electric wire of the invention shows lumps having a height of 10 to 50 mils or having no such lumps, and the total number of such lumps can be made 100 or smaller.

When the electric wire of the invention is produced by 20 hours of continuous extrusion molding to cover a core conductor (18.0 to 24.0 mils in diameter) to a covered wire diameter of 30.0 to 40.0 mils at a covering molding rate within the range mentioned above, the number of lumps formed can be preferably made 30 or smaller, more preferably 20 or smaller.

The size (height) and frequency of occurrence of lumps, so referred to herein, are determined using a lump detector, KW32TRIO (product of Zumbach).

Effects of the Invention

The fluororesin composition of the invention, which has the constitution described hereinabove, has good thermal stability, chemical resistance, solvent resistance, insulating properties and electric characteristics, among others, and further has good moldability and can give moldings with a decreased frequency of molding defects.

The electric wire and foamed electric wire of the invention, which have the respective constitutions described hereinabove, scarcely show molding defects and are excellent in thermal stability, chemical resistance, solvent resistance, insulating properties and electric characteristics, among others.

BEST MODES FOR CARRYING OUT THE INVENTION

The following examples and comparative examples illustrate the present invention in further detail. These examples and comparative examples are by no means limitative of the scope of the invention.

Unless otherwise specified, "part(s)" means "part(s) by mass".

PRODUCTION EXAMPLE 1

PTFE Homopolymer Dispersion

A 100-liter stainless steel autoclave equipped with an anchor impeller and a jacket for temperature adjustment was charged with 49 L of deionized water, 1.4 kg of solid paraffin wax with a melting point of 62° C. and 73 g of ammonium perfluorooctanoate [PFOA] and, after elimination of oxygen from the system inside by purging with nitrogen gas (three times) and with tetrafluoroethylene [TFE] gas (twice) while heating at 85° C., TFE was fed to the autoclave under pressure until arrival of the inside pressure at 6.5 kg/cm$^2$G. Then, an aqueous ammonium persulfate [APS] solution prepared by dissolving 313 mg of APS in 330 ml of water and an aqueous disuccinoyl peroxide [DSP] solution prepared by dissolving 5 g of DSP in 330 ml of water were fed, together with TFE, under pressure until arrival of the autoclave inside pressure at 8.0 kg/cm$^2$G. While the reaction proceeded with increasing speed, TFE gas was continuously fed while the reaction temperature was maintained at 85° C. and the autoclave inside pressure at 8.0 kg/cm$^2$G.

After addition of the aqueous APS solution and aqueous DSP solution, at the time when the TFE consumed by the reaction amounted to 23.8 kg, the feeding of TFE and the stirring were discontinued, the autoclave inside gas was immediately released until ordinary pressure, and the contents (latex) were taken out. The polymer had an average primary particle diameter of 303 nm.

A portion of the latex obtained was evaporated to dryness at 200° C. for 1 hour, and the polymer concentration was calculated at 32.3% by mass based on the solid matter obtained. The polymer had a standard specific gravity of 2.176.

PRODUCTION EXAMPLE 2

Modified PTFE Dispersion

The same apparatus as used in Production Example 1 was charged with 49 L of deionized water, 1.6 kg of solid paraffin wax with a melting point of 56° C. and 50 g of PFOA and, after elimination of oxygen from the system inside by purging with nitrogen gas (three times) and with TFE gas (twice) while heating at 70° C., TFE was fed to the autoclave under pressure until arrival of the inside pressure at 7.0 kg/cm$^2$G. Then, 5 g of perfluoro(propyl vinyl ether) [PPVE] was fed to the autoclave under pressure of TFE, followed by feeding of an aqueous APS solution prepared by dissolving 187 mg of APS in 330 ml of water and an aqueous DSP solution prepared by dissolving 6 g of DSP in 330 ml of water under pressure of TFE until arrival of the autoclave inside pressure at 8.0 kg/cm$^2$G. While the reaction proceeded with increasing speed, the reaction temperature was maintained at 70° C. and the rate of stirring at 280 rpm. TFE was continuously fed to maintain the autoclave inside pressure at 8.0 kg/cm$^2$G.

After addition of the aqueous APS solution and aqueous DSP solution, at the time when the TFE consumed by the reaction amounted to 21.7 kg, the feeding of TFE and the stirring were discontinued, the autoclave inside gas was immediately released until 2.0 kg/cm$^2$G, a chlorotrifluoroethylene [CTFE]-TFE monomer mixture (CTFE content 1.5 mole percent) prepared in advance was then fed, and the reaction was further conducted while the inside pressure was maintained at 8.0 kg/cm$^2$G and the stirring rate at 280 rpm.

At the time when the amount of the monomer mixture consumed arrived at 2.1 kg, the monomer mixture feeding and stirring were discontinued, the autoclave inside gas was released until ordinary pressure, and the contents (latex) were taken out. The polymer had an average primary particle diameter of 298 nm.

A portion of the latex obtained was evaporated to dryness at 200° C. for 1 hour, and the polymer concentration was calculated at 32.2% by mass based on the solid matter obtained. The polymer had a standard specific gravity of 2.173.

The polymer obtained had a PPVE content of 0.02% by mass and a CTFE content of 0.090% by mass.

PRODUCTION EXAMPLE 3

A PTFE homopolymer dispersion with a polymer concentration of 31.8% by mass was obtained in the same manner as in Production Example 1 except that a solution of 397 mg of APS in 330 ml of water and a solution of 6.4 g of DSP in 330 ml of water were used in lieu of the aqueous ASP solution and aqueous DSP solution, respectively, and the initiator amounts were thus varied. The PTFE in this dispersion had a standard specific gravity [SSG] of 2.191. The polymer had an average primary particle diameter of 295 nm.

COMPARATIVE PRODUCTION EXAMPLE 1

A horizontal stainless steel autoclave (capacity 100 L) equipped with a stirrer as deaerated in advance was charged with 26 L of deionized water and, after sufficient purging of the inside with nitrogen gas, was charged with 20 kg of perfluorocyclobutane. While the stirring rate was maintained at 200 rpm and the system inside temperature at 35° C., the autoclave was charged with 2.0 kg of perfluoro(propyl vinyl ether) [PPVE], 3.8 kg of TFE and 100 g of methanol, and 7 g of Peroyl NPP-50M (product of NOF Corp., hydrocarbon-based polymerization initiator) was added to start the polymerization at a system inside pressure of 0.83 MPaG.

By way of compensation for the fall in system inside pressure with the progress of polymerization, TFE was supplemented to maintain the system inside pressure at 0.83 MPaG. Further, 58 g of PPVE per 1.125 kg of TFE supplemented was supplemented. After the lapse of 20 hours following the start of polymerization, the monomer feeding and stirring were discontinued, the autoclave inside gas was immediately released until ordinary pressure, and the contents were washed with water and taken out. The contents obtained were dried at 150° C. for 24 hours to give 12.5 kg of a TFE/PPVE copolymer [PFA] as a white powder. The PFA obtained had a PPVE content of 1.6 mole percent and an MFR of 0.1 (g/10 minutes).

PRODUCTION EXAMPLE 4

A horizontal stainless steel autoclave (capacity 1000 L) equipped with a stirrer as deaerated in advance was charged with 600 L of deionized water and 160 kg of a 10% (by mass) aqueous solution of a fluorinated surfactant ($C_7F_{15}COONH_4$), followed by three repetitions of a nitrogen purging and evacuation procedure. Thereafter, the autoclave was charged with 100 kg of monomeric HFP and further with a TFE-HFP monomer mixture (TFE:HFP=86:14 (% by mass)) and the autoclave inside atmosphere temperature was gradually raised to 95° C. with stirring at a rate of 200 rpm; the pressure rose to 1.5 MPaG. A 10% (by mass) aqueous solution (70 kg) of APS, as a polymerization initiator, was fed to the autoclave to initiate the reaction. The monomer mixture mentioned above was fed to the autoclave continuously to thereby maintain the reaction system inside pressure at 1.5 MPaG. After the lapse of 30 minutes following the start of polymerization, the stirring was discontinued and the autoclave inside gas was released until ordinary pressure to thereby terminate the polymerization reaction; a TFE/HFP binary polymer emulsion/dispersion with a polymer solid concentration of 4.5% by mass was thus obtained.

Separately, the same stainless steel autoclave as used in the above process was deaerated beforehand and was charged with 600 L of deionized water and 20 kg of the above-mentioned binary polymer emulsion/dispersion, followed by three repetitions of a nitrogen purging and evacuation procedure. Thereafter, the autoclave was charged with 138 kg of monomeric HFP and then with 4 kg of perfluoro (propyl vinyl ether) [PPVE], the autoclave inside temperature was gradually raised to 95° C. with stirring at a stirring rate of 200 rpm, and the pressure was raised to 4.2 MPaG by feeding a TFE-HFP monomer mixture (TFE:HFP=87.3:12.7 (% by mass)) under pressure. A 10% (by mass) aqueous APS solution (2.4 kg) was fed as a polymerization initiator to thereby start the polymerization reaction. After start of the reaction, a 10% (by mass) aqueous solution of APS was continuously supplemented at a rate of 22 g/minute. During the reaction, at the times of arrival of the amount of the above-mentioned monomer mixture at 25% by mass, 50% by mass and 75% by mass of the total amount of the monomers fed, 180 g of PPVE was fed each time. The above monomer mixture was continuously fed to maintain the system inside pressure at 4.2 MPaG. After the lapse of 55 minutes following the start of polymerization, the addition of the 10% (by mass) aqueous solution of APS and the stirring were discontinued, the autoclave inside gas was released until ordinary pressure, and the polymerization reaction was finished. A portion of the latex obtained was evaporated to dryness at 200° C. for 1 hour, and the polymer concentration was calculated based on the solid matter and found to be 20.2% by mass.

The polymer obtained had an MFR of 26.2 (g/10 minutes), a TFE/HFP/PPVE ratio of 87.3/11.7/1.0 (% by mass) and a melting point of 257° C.

The data concerning the polymer obtained in each production example were measured by the methods mentioned below.

1. Melt Flow Rate [MFR]

A melt index tester (product of Toyo Seiki Seisakusho) was used and measurements were carried out according to ASTM D 1238-98. About 6 g of the resin was placed in a cylinder maintained at 372° C. and allowed to stand there for 5 minutes for attaining temperature equilibrium. The resin was then extruded through an orifice with a diameter of 2 mm and a length of 8 mm under the load of a 5-kg piston, and the mass (g) of the resin collected per unit time (generally 10 to 60 seconds) was measured. Three measurement runs were carried out with the same sample, and the extrudate amount per 10 minutes was calculated from the mean of the three runs and the value thus obtained (unit: g/10 minutes) was recorded as the measured MFR.

2. Standard Specific Gravity [SSG]

The SSG was measured by the water displacement method according to ASTM D 4895-89.

3. Melting Point

A melting peak was recorded by raising the temperature at a programming rate of 10° C./minute using a differential scanning calorimeter [DSC] (product of Seiko), and the temperature corresponding to the maximum value was recorded as the melting point.

4. Composition

Composition determination was carried out using an NMR spectrometer (Bruker BioSpin model AC300, high-temperature prog.) and an infrared absorption spectrometer (Perkin-Elmer model 1760).

The CTFE content (% by mass) was defined as the value obtained by multiplying the ratio of the absorbance at 2360 $cm^{-1}$ to the absorbance at 957 $cm^{-1}$ among the infrared absorption spectrum bands by 0.58, and the PPVE content (% by mass) was defined as the value obtained by multiplying the ratio of the absorbance at 2360 $cm^{-1}$ to the absorbance at 995 $cm^{-1}$ among the infrared absorption spectrum bands by 0.95.

5. Average Primary Particle Diameter

A working curve was constructed showing the relation between the transmittance of incident light rays having a wavelength of 500 nm per unit length of the polymer latex diluted with water to a solid matter content of 0.22% by mass and the number-based length average particle diameter of PTFE as determined by particle diameter measurements in a certain specific direction on a transmission electron photomicrogaph, and the average primary particle diameter of the sample was determined, using that working curve, from the transmittance measured in the same manner.

Example 1

The TFE/HFP/PPVE terpolymer emulsion/dispersion obtained in Production Example 4 was transferred to a 3000-liter autoclave equipped with a stirrer, and deionized water was added thereto with stirring to adjust the polymer solid concentration to 10.0% by mass. To the dilution was then added, with stirring, the PTFE dispersion obtained in Production Example 1 in an amount of 0.07 part on the solid matter basis per 100 parts of the TFE/HFP/PPVE terpolymer. Then, 40 kg of 60% nitric acid was added and coagulation was caused at a stirring rate of 40 rpm and, after separation into a solid phase and a liquid phase, the water phase was removed. The white powder obtained after washing with deionized water was deprived of water by heating in an air convection oven at 170° C. for 20 hours to give a white perfluoropolymer (A) powder.

Then, sodium carbonate ($Na_2CO_3$) was added to this white perfluoropolymer (A) powder to a final concentration of 30 ppm and, after uniform dispersion, subjected to stabilization (wet heat treatment) and simultaneous melt-pelletization on a twin-screw extruder (product of Japan Steel Works). This extruder had a screw diameter of 32 mm and an L/D ratio of 52.5 and was constituted of a feed zone, a plasticizing zone, a stabilization treatment zone, a vent zone and a metering zone in that order from the material feeding side. The stabilization zone had a temperature of 360° C., the screw speed was 200 rpm, and the raw material was fed at a rate of 15 kg/hour. Air and water were fed at respective flow rates of 0.93 kg/hour and 0.6 kg of water/hour and, while the reaction was allowed to proceed, pelletization was carried out to give a fluororesin composition.

Further, the melting point and MFR of the fluororesin composition obtained were measured by the respective methods mentioned above and further subjected to the following measurements.

1. Die Swell Ratio

Using a capillograph (product of Rosand), 50 g of the resin was placed in a cylinder with an inside diameter of 15 mm as maintained at 372° C.±0.5° C. and allowed to stand there for 5 minutes to render the temperature of the fluororesin composition uniform and then extruded through an orifice with an inside diameter of 1 mm (error not greater than 0.002 mm) and a length of 0.26 mm at a shear rate of 90 (1/s) to give strands (strand length 30±5 mm). The strands obtained were cooled to room temperature and the diameter of the front end portion (portion initially extruded) was measured. Five strands were subjected to this measurement and the die swell ratio was calculated using the mean of the measured values obtained, as follows.

Die swell (%)=[(strand diameter (mm)−orifice inside diameter (mm))/orifice inside diameter (mm)]× 100

2. Melt Tension

A capillograph (product of Rosand) was used. About 50 g of the resin was placed in a cylinder with an inside diameter of 15 mm as maintained at 385° C.±0.5° C. and allowed to stand there for 10 minutes to render the temperature of the fluororesin composition uniform and then extruded through an orifice with an inside diameter of 2 mm (error not greater than 0.002 mm) and a length of 20 mm at a shear rate of 36.5 (1/s) to give a strand.

Further, the above strand was passed through a pulley disposed just below the orifice exit opening at a distance of 45 cm and pulled obliquely upward at an angle of 60° and wound around a roll disposed almost at the same level as the orifice exit opening. The take-up speed of the roll was increased from 5 m/minute to 500 m/minute over 5 minutes and the maximum tension measured under such conditions was recorded as the melt tension.

3. Complex Viscosity and Storage Elastic Modulus

A melt viscoelasticity measuring apparatus (MCR-500, product of Physica) was used. A sample in the form of a cylinder with a diameter of 25 mm and a thickness of 1.5 mm was placed on parallel plates of the apparatus, and melt viscoelasticity measurements were carried out in the manner of frequency dispersion at 310° C. at angular frequencies from 100 rad/sec to 0.01 rad/sec, and both the values at an angular frequency of 0.01 rad/sec were employed.

Then, the following electric wire covering was carried out using the fluororesin composition obtained as the covering material and, during extrusion molding of the electric wire covering, the moldability evaluation was made on the on-line basis according to the procedures described below.

The electric wire covering molding conditions were as follows:
(1) Core conductor: Annealed copper wire AWG24 (American Wire Gauge), core diameter 20.1 mils
(2) Covering thickness: 7.2 mils
(3) Covered electric wire diameter: 34.5 mils
(4) Electric wire take-up speed: 1800 feet/minute
(5) Melt molding (extrusion) conditions
  Cylinder shaft diameter=2 inches
  Single-screw extrusion molding machine, L/D=30
  Die (inside diameter)/tip (outside diameter)=8.71 mm/4.75 mm
  Temperature setting of the extruder: Barrel zone Z1 (338° C.), barrel zone Z2 (360° C.), barrel zone Z3 (371° C.), barrel zone Z4 (382° C.), barrel zone Z5 (399° C.), clamp section (404° C.), adapter section (404° C.), crosshead section (404° C.), die section (404° C.); the core preheating temperature was set at 140° C.
  Melt cone length in molding=3.7 to 4.0 mm 1. Spark-out Measurements After cooling in an air cooling zone and a water cooling zone, about 6 m in length, the portions not covered by the resin during 20 hours of molding were measured for the frequency of sparking at a measuring voltage of 2.0 KV using a spark detector (model HF-20-H, product of Clinton Instrument Company).

2. Lump Size (Height) and Lump Formation Frequency Measurements

Using a lump detector, KW32TRIO (product of Zumbach), the lumps sizes (heights) and the frequency of lump formation were measured during 20 hours of molding.

3. Wire Diameter Fluctuation Measurements

Outside diameter (OD) measurements were carried out for 20 hours using an outside diameter meter, ODAC 15XY (product of Zumbach), and the process capability index [Cp] was calculated. The Cp was analyzed from the outside diameter data obtained using USYS 2000 (product of Zumbach) while the upper limit to the wire diameter (USL) was set at a level 0.5 mil higher than the above-mentioned covered electric wire diameter 34.5 mils and the lower limit thereto (LSL) at a level 0.5 mil lower than the above-mentioned covered electric wire diameter.

4. Capacitance Fluctuation Measurements

Capacitance measurements were carried out for 20 hours using a capacitance meter, Capac HS (type: MR20.50HS, product of Zumbach), and the process capability index [Cp] was calculated. The data were successively stored in USYS 2000 (product of Zumbach) and the Cp was analyzed while the upper limit (USL) was set at +1.0 (pf/inch) and the lower limit (LSL) at −1.0 (pf/inch).

5. Die-drool Occurrences

The die-drool occurrences during 20 hours of molding were judged by the eye.

EXAMPLES 2 TO 5

Fluororesin compositions were obtained by following the same procedure as in Example 1 except that the PTFE dispersion species added and the addition level were changed as shown in Table 2. The compositions were subjected to electric wire covering molding evaluation in the same manner as in Example 1.

EXAMPLE 6

The TFE/HFP/PPVE terpolymer emulsion/dispersion obtained in Production Example 4 was transferred to a 3000-liter autoclave equipped with a stirrer, and deionized water was added thereto with stirring to adjust the polymer solid concentration to 10.0% by mass. To the dilution was then added, with stirring, the PTFE dispersion obtained in Production Example 1 in an amount of 0.07 part on the solid matter basis per 100 parts of the TFE/HFP/PPVE terpolymer. Then, 40 kg of 60% nitric acid was added and coagulation was caused at a stirring rate of 40 rpm and, after separation into a solid phase and a liquid phase, the water phase was removed. The white powder obtained after washing with deionized water was deprived of water by heating in an air convection oven at 170° C. for 20 hours to give a white perfluoropolymer (A) powder.

Then, potassium carbonate ($K_2CO_3$) was added to this white perfluoropolymer (A) powder to a final concentration of 15 ppm and, after uniform dispersion, subjected to stabilization (wet heat treatment) and simultaneous melt-pelletization on a twin-screw extruder (product of Japan Steel Works). This extruder had a screw diameter of 32 mm and an L/D ratio of 52.5 and was constituted of a feed zone, a plasticizing zone, a stabilization treatment zone, a vent zone and a metering zone in that order from the material feeding side. The stabilization zone had a temperature of 360° C., the screw speed was 200 rpm, and the raw material was fed at a rate of 15 kg/hour. Air and water were fed at respective flow rates of 0.93 kg/hour and 0.6 kg of water/hour and, while the reaction was allowed to proceed, pelletization was carried out to give a fluororesin composition.

EXAMPLE 7

The same procedure as in Example 1 was followed and electric wire covering molding evaluation was performed in the same manner except that, among the electric wire covering molding conditions used in Example 1, the electric wire take-up speed was 2400 feet/minute.

EXAMPLE 8

The fluororesin composition obtained in Example 1 and boron nitride (BN, grade SHP-325, average particle diameter 10.3 μm, product of Carborundum) were mixed together to a boron nitride concentration of 7.5% by weight and the mixture was pelletized to give masterbatch pellets, which were mixed with the fluororesin composition pellets of Example 1 in a masterbatch pellets:pellets of Example 1 ratio of 1:9. Using the resulting mixture, foamed electric wire molding was carried out under the conditions described in Table 1.

TABLE 1

| Extruder | Cylinder diameter | 45 | mm |
|---|---|---|---|
|  | Screw L/D | 28 |  |
| Temperature conditions | Cylinder 1 | 326° | C. |
|  | Cylinder 2 | 388° | C. |
|  | Cylinder 3 | 388° | C. |
|  | Cylinder 4 | 388° | C. |
|  | Cylinder 5 | 375° | C. |
|  | Head 1 | 361° | C. |
|  | Head 2 | 357° | C. |
| Extrusion conditions | Screw speed | 21 | rpm |
|  | Cone length | 3.7~4.0 | cm |
|  | Core conductor size | 20.7 | mil |
|  | Covering thickness | 7.6 | mil |
|  | Covering speed | 1600 | fpm |
|  | Nitrogen introduction pressure | 33.0 | MPa |

The molding stability was good, and minute bubbles were uniformly distributed in the foamed electric wire covering obtained and the foaming rate was also high.

COMPARATIVE EXAMPLE 1

The procedure of Example 6 was followed in the same manner except that the addition of the PTFE dispersion was omitted. The thus-obtained fluororesin composition was subjected to electric wire covering molding evaluation.

COMPARATIVE EXAMPLE 2

The PTFE dispersion of Production Example 2 was transferred to a stainless steel coagulation bath equipped with an anchor impeller and a baffle board, water was added to adjust the specific gravity of the PTFE dispersion to 1.074, the temperature was adjusted to 20° C., and 60% nitric acid was immediately added with simultaneous stirring to cause coagulation of the polymer. The polymer was separated from water by filtration, and water was again added to the polymer for washing and simultaneous particle size adjustment. Further, water was removed by filtration, and the polymer was dried at 140° C. for 24 hours to give a PTFE fine powder.

The PTFE fine powder obtained had an apparent density of 0.45 g/ml and the average particle diameter of secondary particles was 490 μm.

Separately, a white perfluoropolymer (B) powder (TFE/HFP/PPVE terpolymer) was obtained in Example 1 without adding the PTFE dispersion.

Then, to the white perfluoropolymer (B) powder in a powder mixer equipped with a stirrer and a kneading block was added the above PTFE fine powder in an amount of 0.07 part per 100 parts of the white powder on the solid matter basis and, after 30 minutes of premixing, the mixture was pelletized in the same manner as in Example 1 to give a fluororesin composition, which was subjected to electric wire covering molding evaluation.

COMPARATIVE EXAMPLE 3

A fluororesin composition was obtained by carrying out pelletization in the same manner as in Example 1 except that 3 parts, per 100 parts of the TFE/HFP/PPVE terpolymer, of the PFA obtained in Comparative Production Example 1 was added to the terpolymer in lieu of the PTFE fine powder. The composition was subjected to electric wire covering molding evaluation.

COMPARATIVE EXAMPLE 4

A fluororesin composition was obtained by carrying out pelletization in the same manner as in Example 1 except that 0.07 part, per 100 parts of the TFE/HFP/PPVE terpolymer, of the PFA obtained in Comparative Production Example 1 was added to the terpolymer in lieu of the PTFE fine powder. The composition was subjected to electric wire covering molding evaluation.

COMPARATIVE EXAMPLE 5

A fluororesin composition was obtained in the same manner as in Example 1 except that 5 parts, per 100 parts of the TFE/HFP/PPVE terpolymer, on the solid matter basis, of the PTFE dispersion obtained in Production Example 1 was added to the terpolymer. The composition was subjected to electric wire covering molding evaluation. Wire diameter fluctuations were large and stable molding was impossible.

The results obtained in Examples 1 to 7 and Comparative Examples 1 to 4 are shown in Table 2.

TABLE 2

| | | Example 1 | Example 2 | Example 3 | Example 4 | Example 5 | Example 6 |
|---|---|---|---|---|---|---|---|
| Polymer added to TFE/HFP/PPVE terpolymer | Species | Production Example 1 | Production Example 1 | Production Example 2 | Production Example 1 | Production Example 3 | Production Example 1 |
| | Addition level (% by mass) | 0.07 | 0.13 | 0.10 | 0.04 | 0.15 | 0.07 |
| | PTFE standard specific gravity (SSG) | 2.176 | 2.176 | 2.173 | 2.176 | 2.191 | 2.176 |
| | PTFE particle diameter (nm) | 303 | 303 | 298 | 303 | 295 | 303 |
| Physical properties of fluororesin composition | Melting point (° C.) | 257 | 257 | 257 | 257 | 257 | 257 |
| | MFR (g/10 min) | 25.9 | 26.5 | 26.2 | 25.5 | 26.4 | 26.4 |
| | Die swell (%) | 18 | 28 | 23 | 9 | 17 | 19 |
| | Melt tension (N) | 0.13 | 0.13 | 0.14 | 0.10 | 0.13 | 0.12 |
| | Complex viscosity (Pa · s) | $3.30 \times 10^3$ | $3.60 \times 10^3$ | $3.49 \times 10^3$ | $3.20 \times 10^3$ | $3.30 \times 10^3$ | $3.33 \times 10^3$ |
| | Storage elastic modulus (Pa) | 0.43 | 2.50 | 1.80 | 0.32 | 0.42 | 0.51 |
| Electric wire evaluation results | Lump formation (number/20 hours) | | | | | | |
| | 10 mils to lower than 20 mils | 5 | 3 | 6 | 8 | 10 | 18 |
| | 20 mils to lower than 30 mils | 0 | 0 | 1 | 2 | 0 | 5 |
| | 30 mils to lower than 40 mils | 1 | 0 | 1 | 1 | 3 | 3 |
| | 40 mils to lower than 50 mils | 1 | 1 | 1 | 1 | 1 | 2 |
| | Amount of die-drool | Slight | Slight | Slight | Slight | Slight | Small |
| | Wire diameter stability (Cp) | 1.7 | 1.4 | 1.6 | 1.7 | 1.5 | 1.3 |
| | Capacitance stability (Cp) | 1.4 | 1.2 | 1.4 | 1.5 | 1.3 | 1.1 |
| | Spark-outs (number/20 hours) | 2 | 2 | 2 | 1 | 2 | 4 |

| | | Example 7 | Comp. Ex. 1 | Comp. Ex. 2 | Comp. Ex. 3 | Comp. Ex. 4 |
|---|---|---|---|---|---|---|
| Polymer added to TFE/HFP/PPVE terpolymer | Species | Production Example 1 | No added | Production Example 2 | Comparative Production Example 1 | Comparative Production Example 1 |
| | Addition level (% by mass) | 0.07 | | 0.07 | 3 | 0.07 |
| | PTFE standard specific gravity (SSG) | 2.176 | | 2.173 | MFR = 0.1 | MFR = 0.1 |
| | PTFE particle diameter (nm) | 303 | — | — | — | — |
| Physical properties of fluororesin composition | Melting point (° C.) | 257 | 257 | 257 | 257 | 257 |
| | MFR (g/10 min) | 25.9 | 25.5 | 24.8 | 26.1 | 25.2 |
| | Die swell (%) | 18 | 2 | 22 | 3 | 2 |
| | Melt tension (N) | 0.13 | 0.07 | Unmeasurable due to resin starvation | 0.08 | 0.07 |
| | Complex viscosity (Pa · s) | $3.30 \times 10^3$ | $2.30 \times 10^3$ | $3.24 \times 10^3$ | $2.42 \times 10^3$ | $2.30 \times 10^3$ |
| | Storage elastic modulus (Pa) | 0.43 | 0.13 | 0.42 | 0.24 | 0.13 |
| Electric wire evaluation results | Lump formation (number/20 hours) | | | | | |
| | 10 mils to lower than 20 mils | 7 | 108 | 75 | 95 | 101 |
| | 20 mils to lower than 30 mils | 2 | 25 | 18 | 22 | 22 |
| | 30 mils to lower than 40 mils | 1 | 22 | 45 | 22 | 26 |
| | 40 mils to lower than 50 mils | 1 | 49 | 56 | 46 | 36 |
| | Amount of die-drool | Slight | Abundant | Abundant | Abundant | Abundant |
| | Wire diameter stability (Cp) | 1.6 | 0.9 | 0.8 | 1.0 | 0.9 |
| | Capacitance stability (Cp) | 1.4 | 0.9 | 0.7 | 0.7 | 0.9 |
| | Spark-outs (number/20 hours) | 4 | 15 | $\geq 500$ | 156 | 17 |

For the electric wire obtained in each Example, it was revealed that the number of lumps formed was smaller than 30, 30-mil or higher lumps were scarcely formed, spark-outs were scarce and the amount of die-drool was slight. On the contrary, for the electric wire obtained in each Comparative Example, the number of lumps formed was 100 or larger. The electric wire of Comparative Example 2, in particular, showed 500 or more spark-outs.

COMPARATIVE EXAMPLE 6

The fluororesin composition of Comparative Example 1 was used for foamed electric wire covering molding under the same conditions as in Example 8. The foamed covering diameter was large and uneven and the resin was inferior in molding stability.

INDUSTRIAL APPLICABILITY

The fluororesin composition of the invention, which has the constitution described hereinabove, has good thermal stability, chemical resistance, solvent resistance, insulating properties and electric characteristics, among others, and further has good moldability and can give moldings with a decreased frequency of molding defects.

The electric wire and foamed electric wire of the invention, which have the respective constitutions described hereinabove, scarcely show molding defects and are excellent in thermal stability, chemical resistance, solvent resistance, insulating properties and electric characteristics, among others.

The invention claimed is:

1. A fluororesin composition comprising a tetrafluoroethylene/hexafluoropropylene-based copolymer and 0.01 to 3 parts by mass per 100 parts said copolymer of a polytetrafluoroethylene having a standard specific gravity of 2.15 to 2.30, and being obtained by mixing an aqueous dispersion of said tetrafluoroethylene/hexafluoropropylene-based copolymer with an aqueous dispersion of said polytetrafluoroethylene, causing coagulation, drying the polymer mixture and melt-extruding the same, which shows a die swell ratio of 5 to 35% and a melt tension of 0.08 to 0.16 N.

2. The fluororesin composition according to claim 1, wherein the polytetrafluoroethylene having a standard specific gravity of 2.15 to 2.30 has an average primary particle diameter of 50 to 800 nm.

3. The fluororesin composition according to claim 1, which shows a complex viscosity of $2.5 \times 10^3$ to $4.0 \times 10^3$ Pa·s and a storage elastic modulus of 0.25 to 3.5 Pa in melt viscoelasticity measurements at 310° C. and at an angular frequency of 0.01 rad/second.

4. The fluororesin composition according to claim 1, which has a sodium element content of 5 to 100 ppm.

5. An electric wire comprising a core conductor and a covering formed around said core conductor using a fluororesin composition, said fluororesin composition being the fluororesin composition according to claim 1.

6. The electric wire according to claim 5, wherein the covering is formed by extrusion covering molding at a running speed of 1000 to 3000 feet/minute and has a process capability index [Cp] in wire diameter fluctuation measurements of not lower than 1.0.

7. The electric wire according to claim 5, wherein the covering is formed by extrusion covering molding at a running speed of 1000 to 3000 feet/minute, and has a process capability index [Cp] in capacitance measurements of not lower than 1.0.

8. The electric wire according to claim 5, wherein the covering is one formed by 20 hours of continuous extrusion covering molding at a running speed of 1000 to 3000 feet/minute, wherein said covering has or is free of lumps 10 to 50 mils in height, the total number of said lumps being not larger than 100.

9. A foamed electric wire comprising a core conductor and a covering formed around said core conductor using a fluororesin composition, said fluororesin composition being the fluororesin composition according to claim 1.

* * * * *